(12) United States Patent
Sakakibara

(10) Patent No.: US 7,969,326 B2
(45) Date of Patent: Jun. 28, 2011

(54) PARKING ASSIST METHOD AND PARKING ASSIST APPARATUS

(75) Inventor: Seiji Sakakibara, Nagoya (JP)

(73) Assignee: Aisin Aw Co., Ltd., Anjo-shi, Aichi-ken (JP)

( * ) Notice: Subject to any disclaimer, the term of this patent is extended or adjusted under 35 U.S.C. 154(b) by 618 days.

(21) Appl. No.: 11/806,075

(22) Filed: May 29, 2007

(65) Prior Publication Data
US 2007/0273554 A1 Nov. 29, 2007

(30) Foreign Application Priority Data

May 29, 2006 (JP) ................................. 2006-148698
Nov. 20, 2006 (JP) ................................. 2006-313510

(51) Int. Cl.
*B60Q 1/48* (2006.01)
(52) U.S. Cl. ...................... 340/932.2; 340/937; 340/938; 340/935; 701/207; 701/211; 701/302
(58) Field of Classification Search .................. 340/148, 340/932.2–943; 701/207, 211, 302
See application file for complete search history.

(56) References Cited

U.S. PATENT DOCUMENTS

| 7,295,227 | B1 | 11/2007 | Asahi et al. ................... 348/118 |
| 7,432,799 | B2 | 10/2008 | Tsuboi |
| 2001/0026317 | A1 | 10/2001 | Kakinami et al. ............ 348/148 |
| 2002/0084916 | A1* | 7/2002 | Shimizu et al. ............ 340/932.2 |
| 2002/1012382 | | 9/2002 | Kuriya at at ...................... 701/1 |
| 2006/0119472 | A1* | 6/2006 | Tsuboi .......................... 340/435 |
| 2008/0077294 | A1 | 3/2008 | Danz et al. ...................... 701/41 |

FOREIGN PATENT DOCUMENTS

| JP | 2002-373327 | 12/2002 |
| JP | 2002-373372 | 12/2002 |
| JP | 2004-017702 | 1/2004 |
| JP | 2004-114879 | 4/2004 |

* cited by examiner

Primary Examiner — George A Bugg
Assistant Examiner — Ojiako Nwugo
(74) Attorney, Agent, or Firm — Bacon & Thomas, PLLC

(57) ABSTRACT

A parking assist apparatus outputs display of a synthesized image of the periphery of a vehicle as a bird's-eye view image, and superimposes, on the synthesized image, turning guide lines based on the current steering angle of the vehicle and straight driving guide lines, along which the vehicle drives in a straight line after turning in accordance with the turning guide lines.

19 Claims, 17 Drawing Sheets

PARKING ASSIST METHOD AND PARKING ASSIST APPARATUS

INCORPORATION BY REFERENCE

The disclosures of Japanese Patent Application No. JP-2006-313510 filed on Nov. 20, 2006 and of Japanese Patent Application No. JP-2006-148698 filed May 29, 2006, including their specifications, drawings and abstracts are incorporated herein by reference in their entirety.

BACKGROUND OF THE INVENTION

1. Field of the Invention

The present invention relates to a parking assist method and a parking assist apparatus.

2. Description of the Related Art

An on-board apparatus for displaying images captured by an on-board camera is known. Such a device inputs an image signal from an on-board camera, attached to the rear end of a vehicle, and outputs a peripheral image based on the image signal, together with guide lines, to a display disposed near the driver's seat.

Japanese Patent Application Publication No. JP-A-2002-373327 describes an image processing apparatus that accumulates image data input from an on-board camera during a parking operation, and processes the accumulated image data to display a bird's-eye view image of the peripheral area around the vehicle.

Japanese Patent Application Publication No. JP-A-2004-114879 discloses an apparatus which not only displays a bird's-eye view image, but also superimposes (1) a predicted route corresponding to the steering angle at the current point in time and (2) a target route into a parking space on the bird's-eye view image.

When a predicted route 71 and a vehicle image 72 are superimposed on a peripheral image 70 as shown in FIG. 22, the resulting image serves favorably as a guide for steering wheel operation or the like, but only (1) the deviation between the route that would be taken were the vehicle to reverse (or advance) at the current steering angle and (2) a target parking space 73 can be learned from the image, and it is impossible to determine a specific steering wheel operation. In other words, insufficient information relating to the driving operation to be performed during parking is provided, and therefore the driver must make repeated small adjustments of the steering angle. Also, with an apparatus that displays a target route to a parking space, such as Japanese Patent Application Publication No. JP-A-2004-114879, the user must specify a target parking space manually so that the target route from the current position to a target position can be calculated. When the parking space does not fit entirely into the camera frame, the parking space cannot be specified, and hence the target route cannot be calculated.

SUMMARY OF THE INVENTION

The present invention has been made in consideration of the above-mentioned problems, and an object is to provide a parking assist method and a parking assist apparatus for assisting steering wheel operation during parking.

In the parking assist method according to a first aspect of the invention, a straight driving guide index is displayed together with a peripheral image, and therefore a vehicle need only be turned to the position indicated by the straight driving guide index and then driven in a straight line in accordance with the straight driving guide index from that straight driving guide index position. Hence, a parking operation is assisted, which operation would otherwise require a comparatively high level of driving skill.

According to a second aspect, the present invention provides an apparatus which displays the straight driving guide index, enabling the vehicle to drive into a target parking space by driving in a straight line, together with the peripheral image. Accordingly, the driver need only turn the vehicle to the straight driving guide index and then turn the steering wheel back to straighten the wheels from the index onward and drive in a straight line. Thus, the steering wheel operation of the vehicle is assisted during a parking operation which would otherwise require a high level of driving skill.

According to a third aspect, the present invention provides an apparatus which displays a predicted route index of the vehicle, corresponding to the current steering angle, together with the peripheral image, and therefore the route of the vehicle to the target parking space is made more easily understandable.

According to a fourth aspect, the present invention provides an apparatus which displays a straight driving guide index representing position where straight lines denoting a path of straight movement into a target parking space intersect turning course lines, which turning course lines correspond to the current steering angle. Accordingly, the driver need only drive the vehicle to the straight driving guide index with the current steering angle, then turn the steering wheel back to straighten the wheels at that index position and then drive in a straight line. Alternatively, if the straight driving start position is determined to be inappropriate, the position of the straight driving guide index may be modified by turning the steering wheel.

According to a fifth aspect, the present invention provides display of straight driving course lines parallel to the defining lines (approximating white lines defining a target parking space) extending from a position at which the vehicle has become oriented in parallel with the defining lines, and therefore deviation between a straight driving course line and a white line in the peripheral image can be seen and understood.

The parking assist apparatus, according to a sixth aspect of the present invention, displays a predicted position index where the vehicle is predicated to become parallel to the defining lines. In other words, the straight driving start position is indicated by the display of the exterior shape of the vehicle, and therefore the parking start position can be understood intuitively.

According to a seventh aspect, the present invention provides a parking assist apparatus which displays predicted course lines extending from the rear of the vehicle to the contact points between the straight defining lines, or straight lines parallel thereto, and the predicted turning course lines, i.e. displays a predicted route index. Hence, a predicted route to the straight driving start position, corresponding to the current steering angle, is displayed.

According to an eighth aspect, the present invention provides a parking assist apparatus which displays a current position index superimposed on the peripheral image, and therefore the relative position between the target parking space displayed on the peripheral image and the vehicle can be easily seen. Furthermore, each of the guide lines superimposed on the peripheral image can be understood intuitively.

According to a ninth aspect, the present invention provides an apparatus which displays a current dead angle area of an imaging device using most current image data and recorded image data captured and accumulated in the past. Hence, the target parking space can be confirmed for a wider range.

According to a tenth aspect, the present invention provides an apparatus which displays the straight driving guide index together with a bird's-eye view image, and therefore the relative position between the target parking space and the straight driving guide index can be easily understood.

DETAILED DESCRIPTION OF THE PREFERRED EMBODIMENTS

First Embodiment

A first embodiment of a parking assist apparatus according to the present invention will be described below with reference to FIGS. 1 to 14.

Figure 1A:
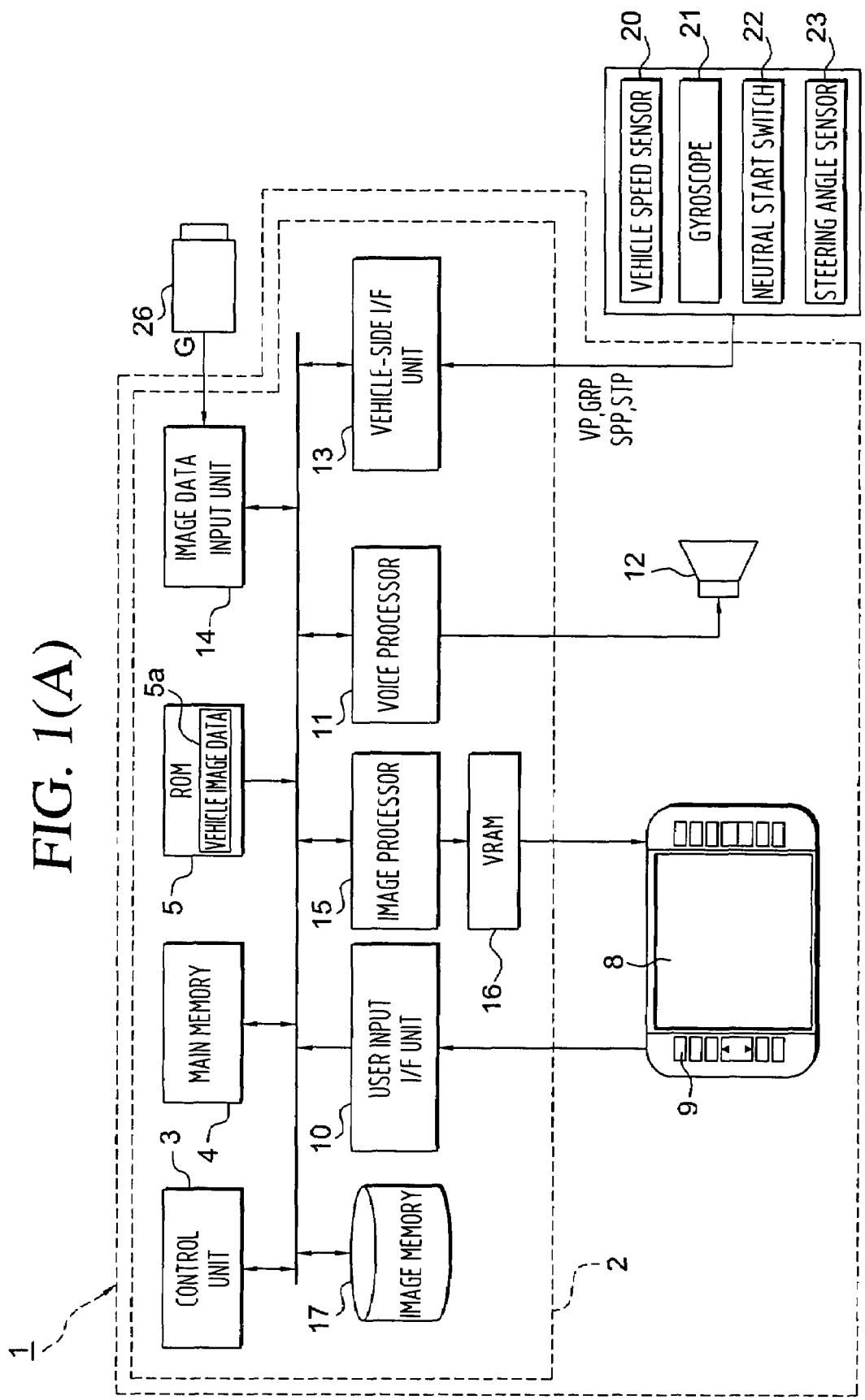
FIG. 1A is a block diagram of a parking assist system according to an embodiment of the present invention.
Figure 1B:
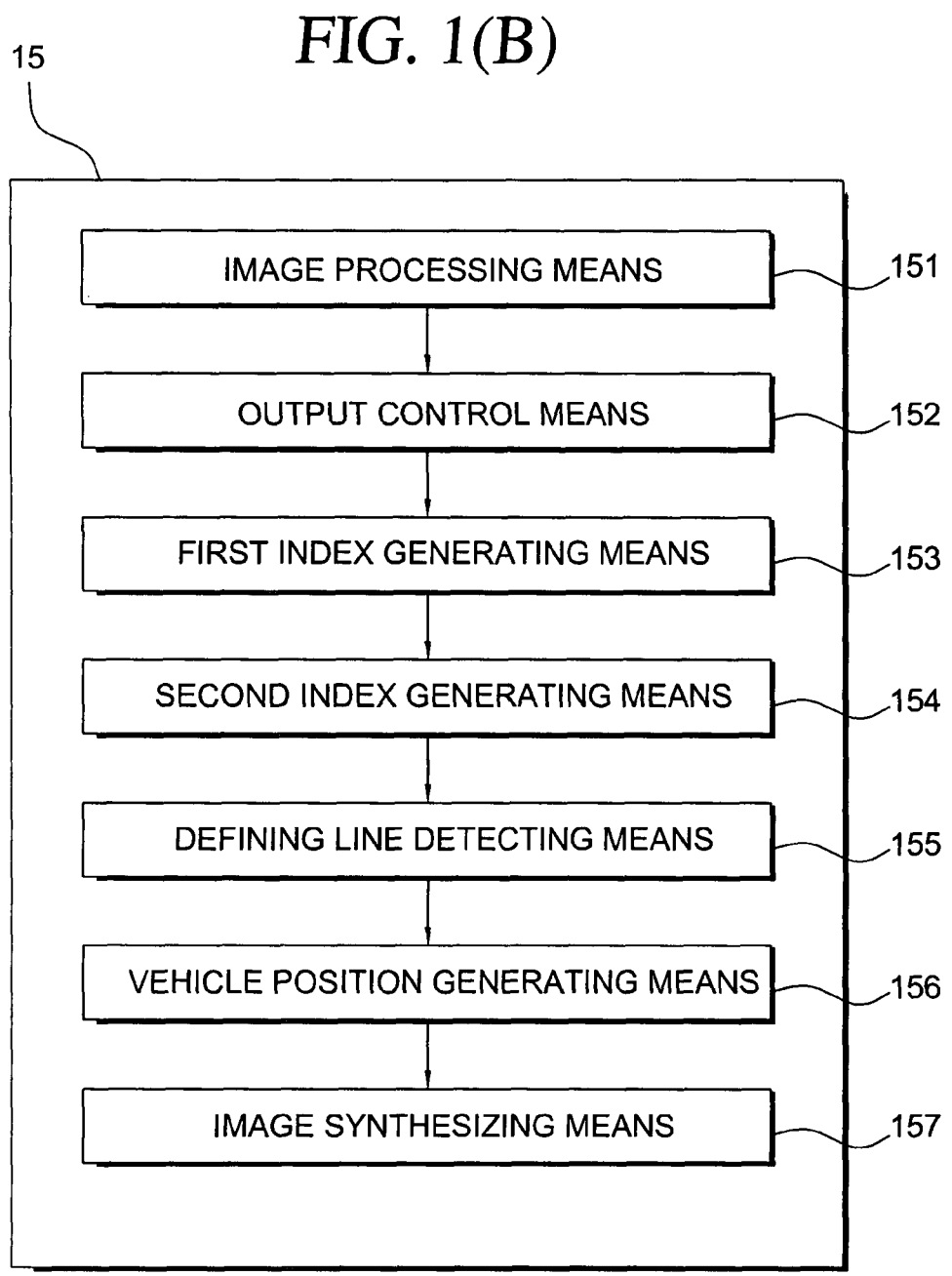
FIG. 1B is a block diagram of the image processor 15 in FIG. 1A.

As shown in FIG. 1, the parking assist system 1 includes a controller 2 serving as a parking assist apparatus. The controller 2 includes a control unit 3, a main memory 4, and a ROM 5. The control unit 3 includes a CPU and the like, not shown in the drawing, and is the primary control for execution of various programs such as a parking assist program stored in the ROM 5. The main memory 4 temporarily stores the results of calculations by the control unit 3, and also stores various variables, flags, and so on used to provide parking assistance.

Figure 2:
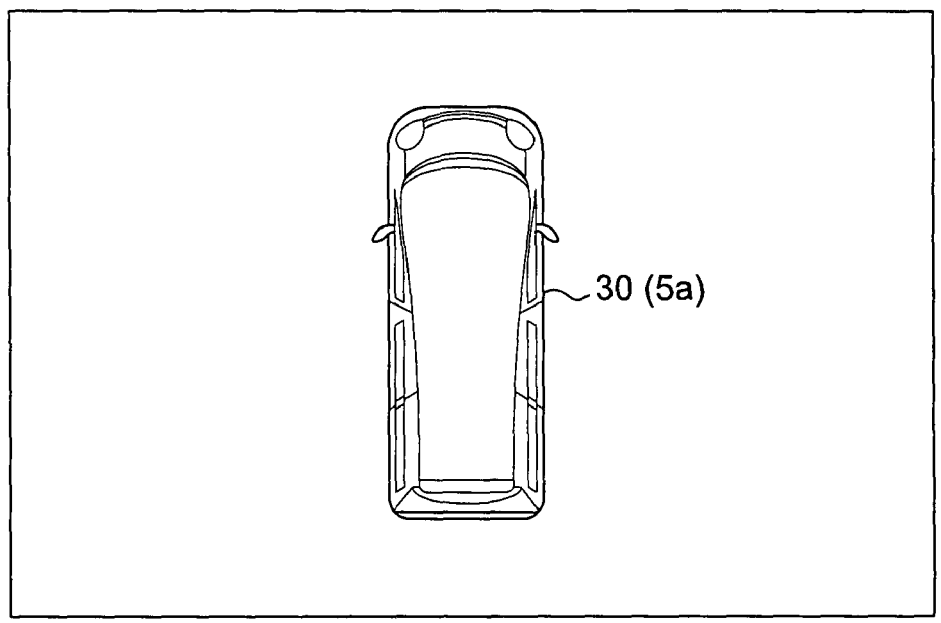
FIG. 2 is an example of a vehicle image.

The ROM 5 stores vehicle image data 5a for output to a display 8 to display an image of the vehicle (see FIG. 3) in which the parking assist system 1 is installed. When the vehicle image data 5a is output to the display 8, a vehicle image 30 serving as a current position index, such as that shown in FIG. 2, is displayed.

The display 8 is a touch panel and, when an input operation is performed on the touch panel, a signal corresponding to the input operation is output to the control unit 3 via a user input interface unit (user input I/F unit 10) provided in the controller 2. Likewise, when an input is performed by user operation of switch 9, provided adjacent to the display 8, a signal corresponding to the input operation is output to the control unit 3 via the user input I/F unit 10.

The controller 2 also has a voice processor 11. The voice processor 11 includes memory storing a voice file and a digital/analog converter, and uses the voice file to output a voice guidance or warning through a speaker 12 incorporated into the parking assist system 1.

The controller 2 also has a vehicle side interface unit (vehicle side I/F unit 13). Through the vehicle side I/F unit 13, the control unit 3 receives a vehicle speed pulse VP from a vehicle speed sensor 20 provided in the vehicle C, and counts the pulses. The control unit 3 also receives a bearing detection signal GRP from a gyroscope 21 via the vehicle side I/F unit 13, and updates the current bearing, which is a variable stored in the main memory 4.

The control unit 3 also receives a shift position signal SPP from a neutral start switch 22 of the vehicle C via the vehicle side I/F unit 13, and updates the shift position, which is another variable stored in the main memory 4. The control unit 3 further receives a steering sensor signal STP from a steering angle sensor 23 via the vehicle side I/F unit 13. On the basis of the steering sensor signal STP, the control unit 3 updates the current steering angle of the vehicle C, which is also stored in the main memory 4.

When a shift position signal SPP indicating reverse is input, the control unit 3 sets the position of the vehicle at this time as a reference position. Then, on the basis of the vehicle speed pulse VP and the steering sensor signal STP, the control unit 3 calculates relative coordinates and a relative steering angle from the reference position.

The controller 2 also has an image data input unit 14 serving as an image data obtaining device. The image data input unit 14 obtains sets of image data G successively by drive-controlling a back monitor camera 25 (hereinafter simply "camera"), which serves as an imaging device provided in the vehicle C, under control of the control unit 3.

Figure 3:
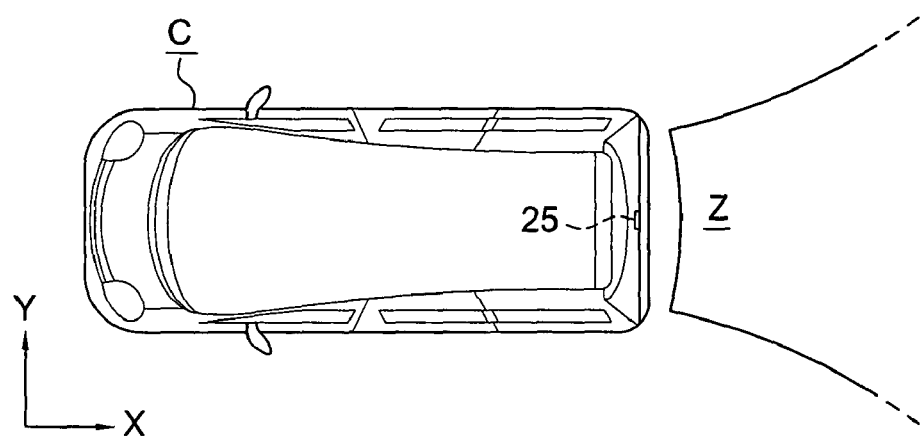
FIG. 3 is a view illustrating an imaging range of a camera.

As shown in FIG. 3, the camera 25 is attached to the rear end of the vehicle, for example the hatch door of the vehicle C, such that the optical axis is oriented downward. The camera 25 is a digital camera for capturing color images, and has an optical mechanism including a wide angle lens, a mirror, etc., and a CCD imaging element (neither of which are shown in the drawing). The camera 25 has a visual field of 140 degrees to the left and right, for example, and an imaging region Z which extends rearward for several meters, including the rear end of the vehicle C. Responsive to signals from the control unit 3, the image data input unit 14 obtains image data G having undergone analog/digital conversion by the camera 25, and stores the image data G temporarily in image memory 17 serving as an image data storage device, provided in the controller 2. Alternatively, the camera 25 may output an image signal to the image data input unit 14, whereupon the image data input unit 14 performs analog/digital conversion of the image signal to generate the image data G.

Figure 4A:
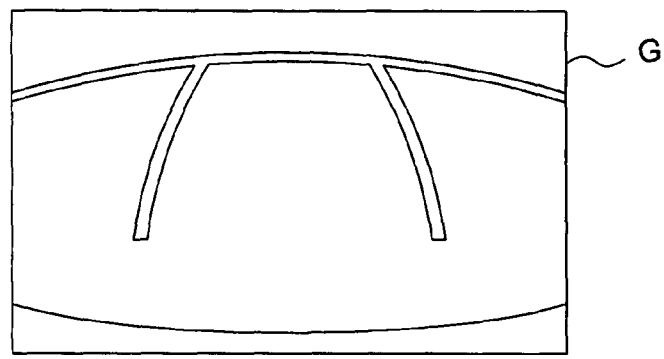
FIG. 4A is a view of an image of a parking space.
Figure 4B:
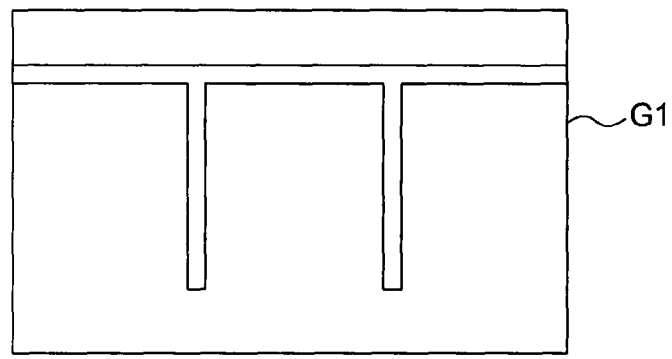
FIG. 4B is a bird's-eye view of the same parking space in FIG. 4A.

As further shown in FIG. 1, the controller 2 also has an image processor 15 serving as image processing means 151, output control means 152, first index generating means 153, second index generating means 154, defining line detecting means 155, vehicle position (image) generating mans 156, and image synthesizing means 157. When the vehicle C has moved in reverse from the reference position by an image recording distance D1 (in this embodiment, 100 mm), the image processor 15 receives image data G, such as indicated by the pattern shown in FIG. 4A, via the image data input unit 14. Then, by subjecting the image data G to a conventional geometric conversion, bird's-eye view data G1, serving as recorded image data such as shown in FIG. 4B, is generated. The viewpoint of the camera 25 is diagonally upward from the road surface, but the bird's-eye view data G1 is converted into image data in which the road surface is seen from vertically above.

Figure 5:
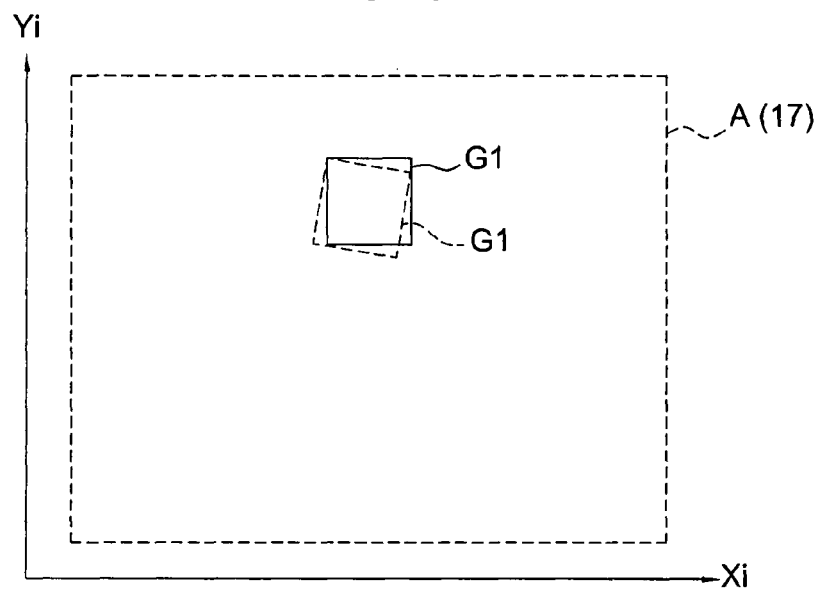
FIG. 5 is an illustration of bird's-eye view data writing.

Further, the image processor 15 receives from the control unit 3 coordinate data indicating the relative coordinates, i.e. relative to the reference position, and steering angle data indicating a relative steering angle, i.e. relative to the steering angle in the reference position. Then, as shown in FIG. 5, the bird's-eye view data G1 is generated for the area indicated by a solid line, from the coordinate data and steering angle data of a memory area A of the image memory 17. When generating bird's-eye view data G1 for reverse movement from the reference position, after generation of the bird's-eye view data G1 for the reference position, the bird's-eye view data G1 is overwritten as indicated by the dot-dash line on the basis of the relative coordinates and relative steering angle, i.e. relative to the reference position. Pixel values of the newer bird's-eye view data G1 are selected and written into the area in which the sets of bird's-eye view data G1 overlap. In so doing, an image based on the previously written bird's-eye view data G1 and an image based on the latter generated bird's-eye view data G1 form a continuous image. Thus, with each increment of movement in reverse by vehicle C an image recording distance D1, an additional set of bird's-eye view data G1 is captured (at each imaging point) and accumulated in the image memory 17.

When at least a predetermined amount of bird's-eye view data G1 has been accumulated in the image memory 17, the image processor 15 reads the bird's-eye view data G1 for a predetermined area. Furthermore, the most recent image data G reflecting the current conditions around the periphery of the vehicle (hereinafter "current image data G2") is newly obtained from the camera 25. After converting the current image data G2 to bird's-eye view data, the bird's-eye view data G1 and the bird's-eye view-converted current image data G2 are combined by synthesis processing to produce synthesized data G3 which is presented on the display 8.

Figure 6A:
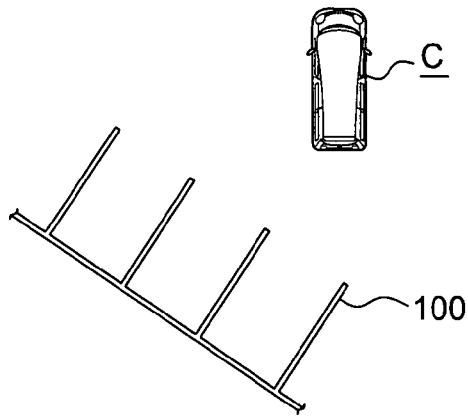
FIG. 6A is a view of a parking guidance image.
Figure 6B:
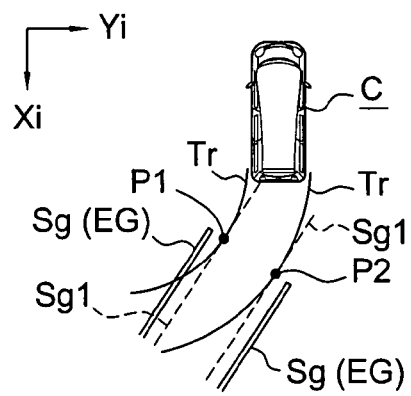
FIG. 6B is an illustration of guide line calculation.

Further, the image processor 15 superimposes guide lines on the image synthesized from the bird's-eye view data G1 and the current image data G2. More specifically, first the image processor 15 detects white lines defining the target parking space. In this embodiment, image processor 15 executes a conventional edge extraction routine. For example, the synthesized data G3 forming a color image is converted into grayscale data, and thresholds such as an average brightness value and a median value are set. When the brightness difference (gradient) or the like between pixels is less than a threshold amount, an edge is not detected, and when the brightness difference or the like is equal to or greater than the threshold, an edge is detected. Alternatively, the brightness of each pixel of the bird's-eye view data G1 is converted into grayscale data and the pixel value difference between each pixel and the pixel adjacent thereto is detected. Then, a large pixel difference is detected as an edge. As shown in FIG. 6A, for example, when white lines 100 serving to define parking spaces ("defining lines") to the rear of the vehicle are captured by the camera 25 and bird's-eye view data G1 is generated, the synthesized data G3 using this bird's-eye view data G1 is processed for edge detection, and as a result, the white lines 100 are extracted as edges EG, as shown in FIG. 6B.

A discontinuous edge EG may be detected as a result of edge extraction, processing and therefore the image processor 15 performs a Hough transformation, for example, of the results of the edge extraction to recognize an edge EG as a straight line (segment) within the image. The image processor 15 then forms the straight line (segment) determined in this manner as an approximated white line Sg.

Further, on the basis of the steering sensor signal STP, the image processor 15 determines a pair of predicted course lines Tr of the vehicle C, spaced apart by a distance representing (corresponding to) the vehicle width, as an expression within the image coordinate system (Xi, Yj), and determines a contact point between the predicted course line Tr and the approximated white lines Sg. As shown in FIG. 6B, when the predicted course lines Tr and the approximated white lines Sg do not contact lines Sg1, which are parallel to and within the approximated white lines Sg and which contact the predicted course line Tr, are calculated.

Figure 6C:
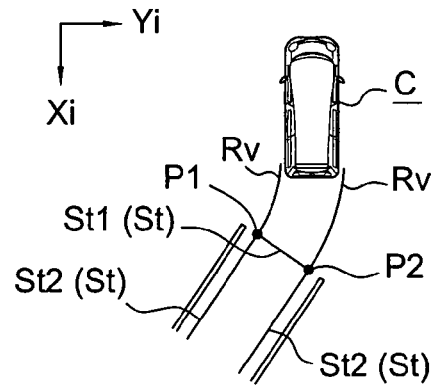
FIG. 6C is a guidance image with guide lines.

After calculating the approximated white lines Sg or lines Sg1 parallel thereto and the coordinates points P1, P2 where they contact the predicted course lines Tr, a first line segment St1 serving as a straight driving start position, a straight line which connects contact points P1, P2 and which represents the actual width of the vehicle, is determined, as shown in FIG. 6C. The first segment St1 indicates a rear axle position reached when the vehicle C reverses along the predicted course lines Tr from its current position so that the vehicle becomes parallel to the approximated white lines Sg. In other words, by movement in reverse from the current position of the vehicle C toward the first segment St1, if the vehicle C turns in accordance with the predicted course lines Tr while maintaining the current steering angle, the position of rear axle of the vehicle C will come to coincide with (match) the first segment St1. Accordingly, if the vehicle C drives straight back from the position where the rear axle of the vehicle C coincides with the first segment St1, the vehicle C will be parked parallel to the white lines 100.

After determining the first segment St1 as described above, the image processor 15 determines second segments St2 serving as straight driving course lines having a length substantially identical to the vehicle length, which are parallel to the approximated white lines Sg or the parallel lines Sg1 and which extend from the contact points P1, P2. The driver can learn from the second segments St2, the relative distance between the vehicle body and the white lines 100 and, therefore, can learn the leeway on either side of the vehicle C after turning at the current steering angle and then driving in a straight line. The first segment St1 and second segments St2 are straight driving guide lines St which serve as a straight driving guide index providing information relating to following a straight course after turning. Further, the image processor 15 repeatedly cuts the predicted course lines Tr to provide turning guide lines Rv serving as a predicted route index corresponding to the distance from the rear end of the vehicle to the first segment St1. The turning guide lines Rv and straight driving guide lines St are superimposed onto the image based on the synthesized data G3.

Figure 7:
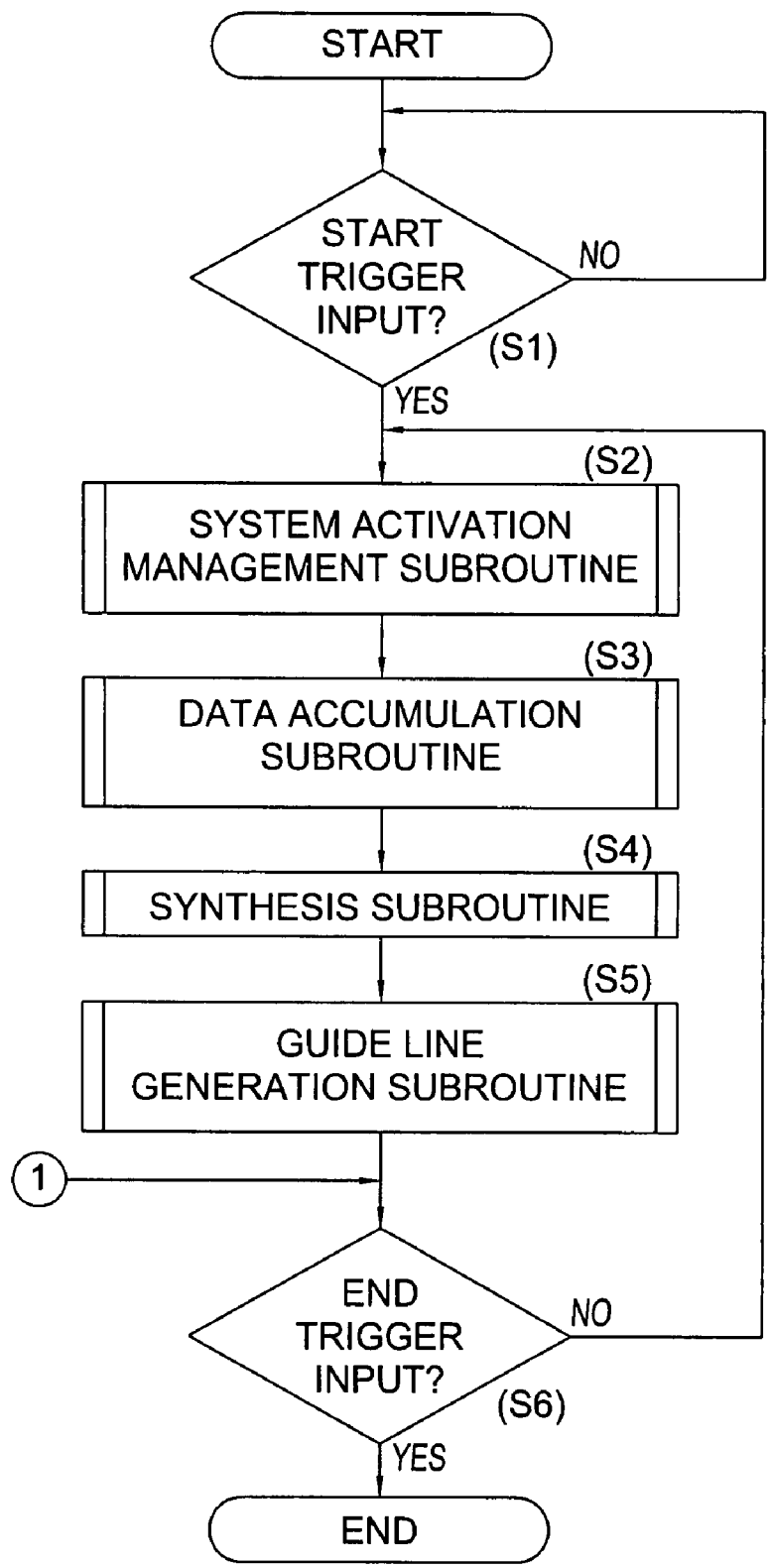
FIG. 7 is a flow chart of a control routine executed by the system illustrated in FIG. 1A.

Next, the method of operation of this embodiment will be described with reference to FIGS. 7 to 11. As shown in FIG. 7, first the control unit 3 waits for input of a start trigger in accordance with the parking assist program stored in the ROM 5 (step S1). In this embodiment, the start trigger is an input signal generated upon activation of an ignition module. When the start trigger is input, the system activation management subroutine (step S2), data accumulation subroutine (step S3), synthesis subroutine (step S4), and approximated white line subroutine (step S5) are executed under overall control of the control unit 3. The control unit 3 then determines whether or not an end trigger has been input (step S6), and if not, returns to S2. In this embodiment, the end trigger is an input signal generated when the ignition module is switched OFF or the parking assist system 1 is shut down.

Figure 8:
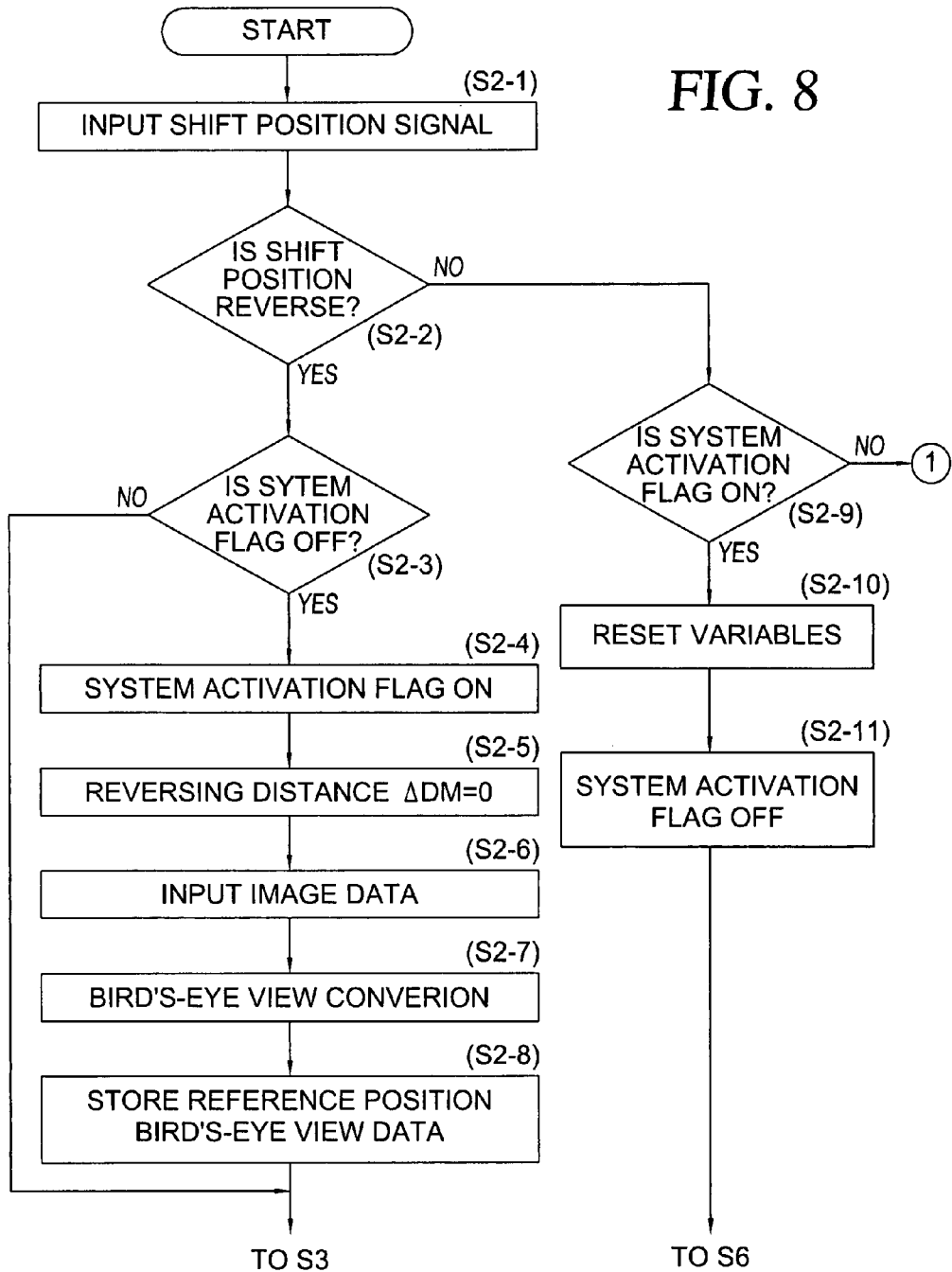
FIG. 8 is a flow chart of a subroutine executed as step S2 IN FIG. 7.

Next, the system activation management subroutine S2 will be described with reference to FIG. 8. First, the control unit 3 receives the shift position signal SPP via the vehicle side I/F unit 13, and updates the shift position, which is a variable stored in the main memory 4 (step S2-1). Then, the control unit 3 determines whether or not the shift position is reverse (step S2-2). When the shift position is determined to be reverse (YES in S2-2), the current position of the vehicle C is set as the reference position.

Next, the control unit 3 determines whether or not a system activation flag stored in the main memory 4 is OFF (step S2-3). The system activation flag is a flag indicating whether or not a parking assist mode has been activated. Having determined that the system activation flag is ON (NO in step S2-3), the control unit 3 advances to the subsequent data accumulation subroutine (step S3).

When the shift position shifts to reverse, the control unit 3 determines that the system activation flag is OFF (YES in S2-3). In this case, the control unit 3 updates the system activation flag to ON (step S2-4). Further, the control unit 3 initializes a reversing distance ΔDM, which is a variable stored in the main memory 4, to "0" (step S2-5). Further, under control of the control unit 3, the image processor 15 receives the image data G from the camera 25 via the image data input unit 14 (step S2-6), and subjects the image data G to bird's-eye view conversion (step S2-7), as shown in FIGS. 4A and 4B, to generate the bird's-eye view data G1.

Further, the image processor 15 stores the bird's-eye view data G1 in a data area corresponding to the reference position within the image memory 17 via the control unit 3 (step S2-8). After storing the reference position bird's-eye view data G1, the routine advances to the subsequent data accumulation subroutine.

Figure 9:
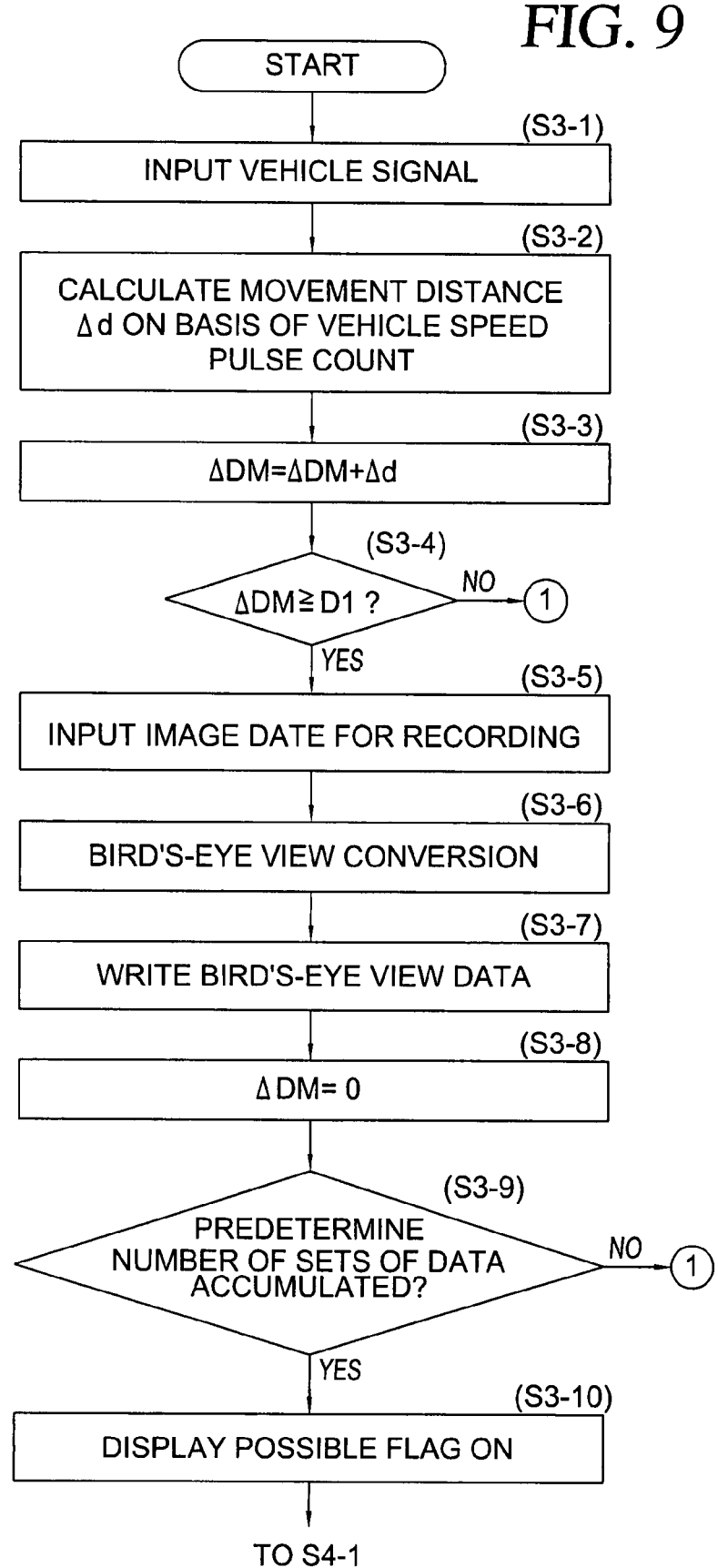
FIG. 9 is a flow chart of a subroutine executed as step S3 IN FIG. 7.

The data accumulation subroutine will now be described with reference to FIG. 9. First, the control unit 3 receives, as vehicle signals the vehicle speed pulse VP and the steering sensor signal STP (step S3-1). As described above, the control unit 3 counts the vehicle speed pulses VP as the vehicle C moves in reverse. Then, on the basis of the pulse count, the control unit 3 updates the movement distance Δd stored in the main memory 4 (step S3-2). Further, the control unit 3 updates the reverse distance ΔDM by adding the movement distance Δd to the reverse distance ΔDM as initialized in step S2-5 (step S3-3). When the reverse distance ΔDM is updated, the movement distance Δd is reset. A determination is then made as to whether or not the reverse distance ΔDM is equal to or greater than the image recording distance D1 (step S3-4). In this embodiment, the image recording distance D1 is set at 100 mm.

When it is determined that the reverse distance ΔDM is less than the image recording distance D1 (NO in step S3-4), the routine advances to step S6 (see FIG. 7), where a determination is made as to whether or not an end trigger has been input. When an end trigger has not been input (NO in step S6), the routine returns to the system activation management subroutine (step S2).

On the other hand, when it is determined that the reverse distance ΔDM is equal to or greater than the image recording distance D1 (YES in step S3-4), the image processor 15 receives a set of image data G for recording (step S3-5). This image data G is then converted to bird's-eye view data G1 such as shown in FIG. 4B (step S3-6). The image processor 15 also inputs coordinate data and steering angle data relating to the time at which a set of image data G for recording is captured, and writes the bird's-eye view data G1 for a position corresponding to the coordinate data and steering angle data within the memory area of the image memory 17 (step S3-7). When a set of bird's-eye view data G1 is written in the image memory 17, a data counter stored in the main memory 4 adds one count to the reverse distance ΔDM which has been initialized to "0" (step S3-8).

Then, on the basis of the data set counts stored by the data counter stored in the main memory 4, the control unit 3 determines whether or not a predetermined amount of bird's-eye view data G1 has been stored in the image memory 17 (step S3-9). The predetermined amount is set at 10, for example, and when the control unit 3 determines that the predetermined amount of bird's-eye view data G1 has been stored (YES in step S3-9), a display enabled flag stored in the main memory 4 is switched ON (step S3-10), and the routine advances to the subsequent synthesis subroutine (step S4). The display enabled flag is a flag indicating whether or not synthesized data G3 can be obtained employing the bird's-eye view data G1. When it is determined that the predetermined amount of bird's-eye view data G1 has not been stored (NO in step S3-9), the routine advances to the step S6, where a determination is made as to whether or not an end trigger has been input, and when an end trigger has not been input, the routine returns to step S2.

Figure 10:
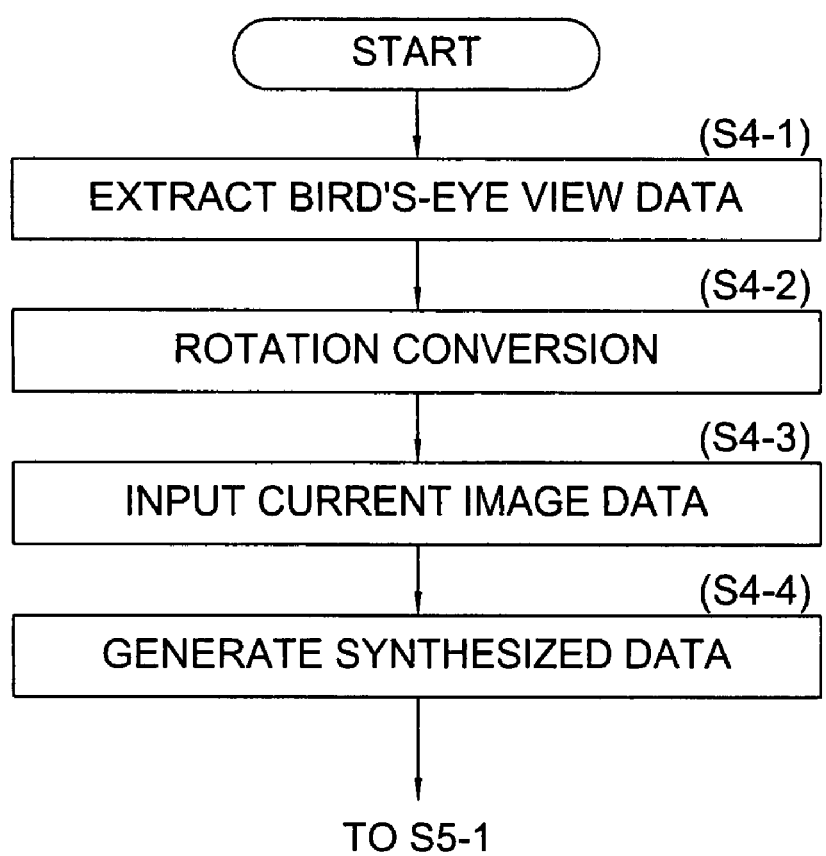
FIG. 10 a flow chart of a subroutine executed as step S4 IN FIG. 7.

Next, the synthesis subroutine will be described with reference to FIG. 10. First, the image processor 15 extracts a predetermined area based on the current coordinates and current steering angle of the vehicle C from a memory area A of the main memory 17 in which the bird's-eye view data G1 is written (step S4-1). In this embodiment, pixel values of the bird's-eye view data G1 written in an area corresponding to the current rear portion of the vehicle C and the periphery thereof are read from the memory area A of the image memory 17.

The bird's-eye view data G1 extracted from the image memory 17 is rotated in accordance with the current steering angle (step S4-2).

Figure 12:
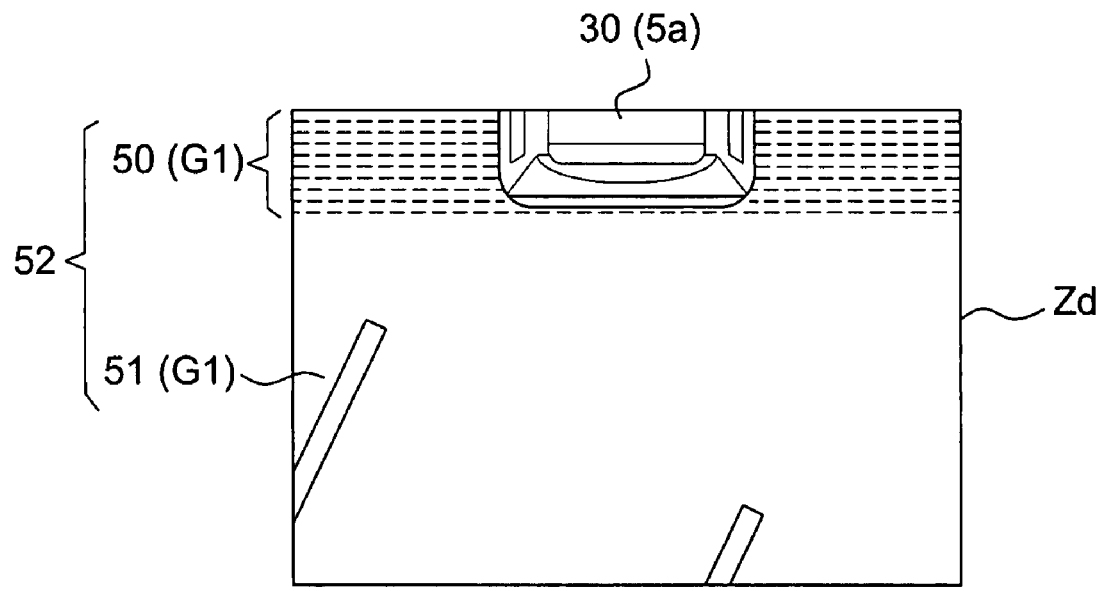
FIG. 12 is an illustration of a synthesized image.

Further, the image processor 15 receives the current image data G2 from the camera 25 (step S4-3), and generates the synthesized data G3 using the bird's-eye view data G1 and current image data G2 (step S44). More specifically, as shown in FIG. 12, the image processor 15 presents the rotated bird's-eye view data G1 at the top of a display area Zd of the display 8. The image processor 15 also converts the current image data G2 to bird's-eye view data and presents the converted current image data G2 as a bird's-eye view at the bottom of the display area Zd of the display 8. Thus, a peripheral image 50 based on the bird's-eye view data G1 is displayed at the top of the display area Zd. The peripheral image 50 is an image showing the current rear portion of the vehicle C and the vicinity thereof, and displays the current dead angle area of the camera 25. A peripheral image 51 based on the current image data G2 is displayed at the bottom of the display area Zd. The current image 51 is an image of the current imaging area Z of the camera 25, and is a bird's-eye view image of the road surface included in the imaging area Z.

Figure 11:
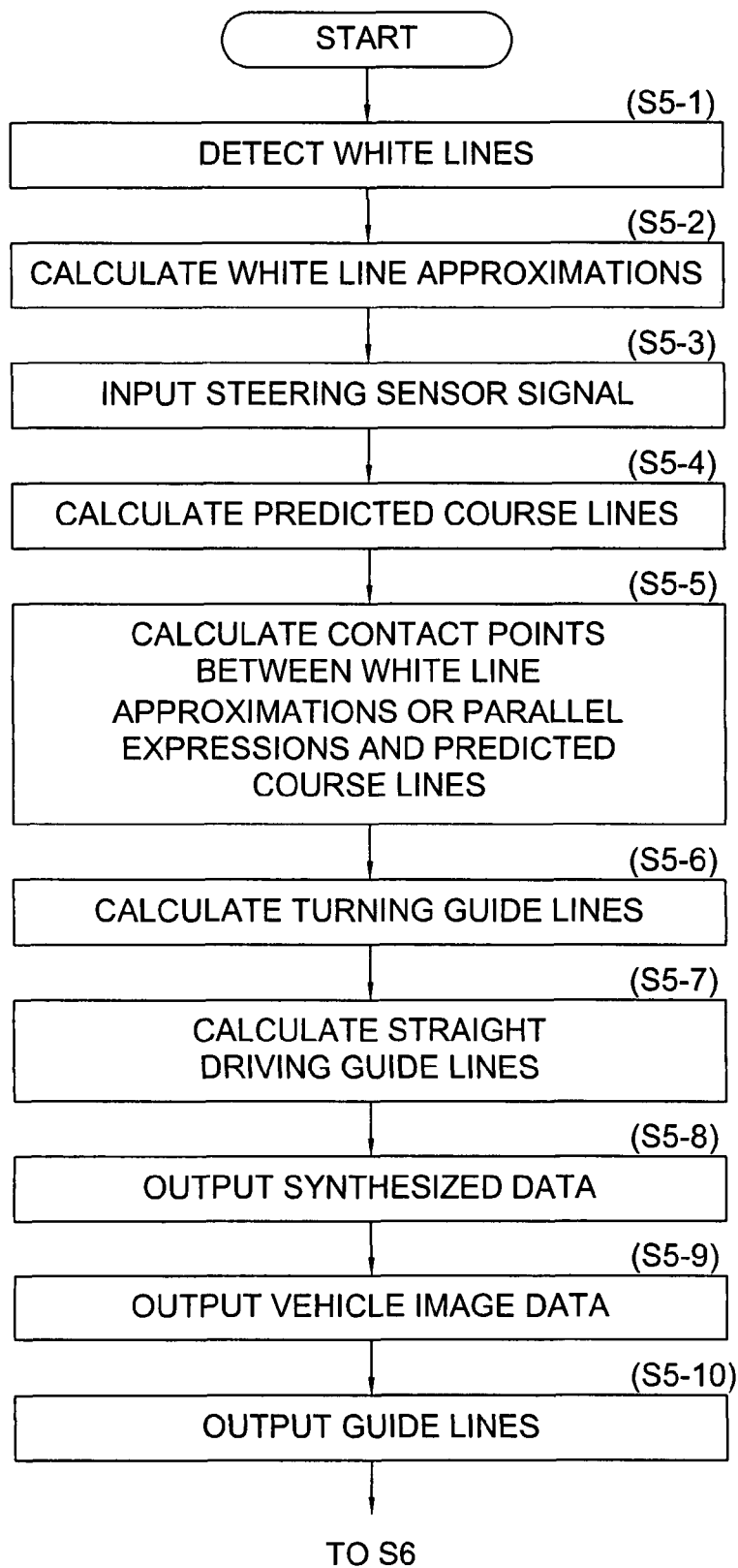
FIG. 11 a flow chart of a subroutine executed as step S5 IN FIG. 7.

Next, the image processor 15 executes the subroutine shown in FIG. 11. First, the image processor 15 executes the white line detection described above on the synthesized data G3 (step S5-1). The image processor 15 converts the synthesized data G3 into grayscale data and executes edge extraction on the basis of the brightness of each pixel. Further, the image processor 15 performs a Hough transformation or the like on the results of edge extraction to calculate approximated white lines Sg such as those shown in FIG. 6B (step S5-2). At this time, only the edges EG at the tip end of each white line 100 need be detected. In this embodiment, when the pair of approximated white lines Sg cannot be calculated because the edges EG cannot be detected, the predicted course lines Tr are simply superimposed on the current image 51.

Further, the control unit 3 receives the steering sensor signal STP via the vehicle side I/F unit 13 (step S5-3), and calculates the predicted course lines Tr (step S5-4).

Next, as shown in FIG. 6B, the contact points P1, P2, i.e. points of intersection between the predicted course lines Tr and the approximated white lines Sg are calculated (step S5-5). As described above, when the predicted course lines Tr and approximated white lines Sg do not intersect, lines Sg1, which are parallel to the approximated white lines Sg and which intersect the predicted course lines Tr, are calculated, and the contact points P1, P2 of intersection between the predicted course lines Tr and parallel lines Sg1 are determined.

Once the contact points P1, P2 have been calculated, turning guide lines Rv having the contact points P1, P2 as terminals are calculated (step S5-6). At this time, the image processor 15 cuts the predicted course lines Tr so that the remainder of the course lines Tr, from the vehicle rear end to the contact points P1, P2, serve as the turning guide lines Rv, as shown in FIG. 6C.

The image processor 15 also calculates the straight driving guide lines St (step S5-7). In other words, as described above, the contact points P1, P2 are connected and the resulting first segment St1 is determined as a straight line expression. Further, using the contact points P1, P2 as starting points, the image processor 15 calculates the pair of second segments St2 parallel to the respective approximated white lines Sg or parallel lines Sg1.

Next, the image processor 15 outputs the synthesized data G3 stored in the VRAM 16 to the display 8 (step S5-8). The image processor 15 also outputs vehicle image data 5a in a predetermined position, and displays a synthesized image 52 serving as a peripheral image such as that shown in FIG. 12, on the display 8 (step S5-9).

Figure 13:
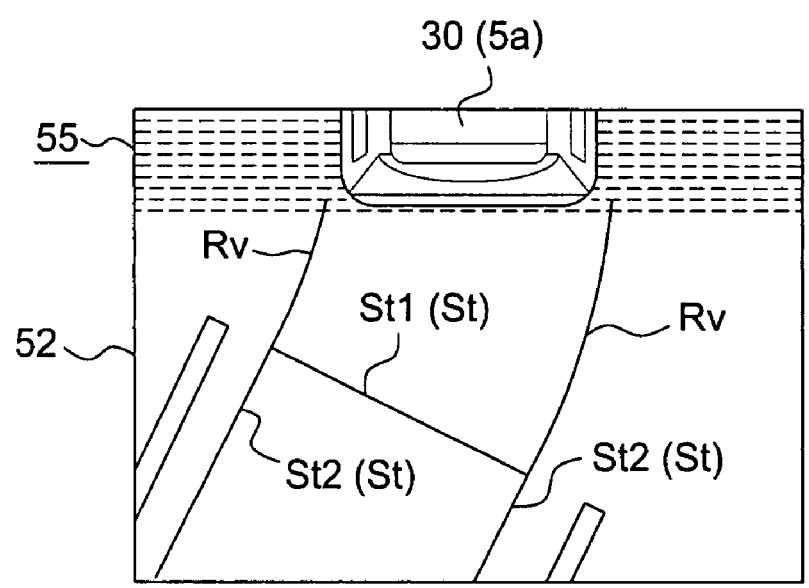
FIG. 13 is an illustration of a parking assist screen.

The image processor 15 then superimposes the turning guide lines Rv and the straight driving guide lines St on the synthesized image 52 (step S5-10). Thus, a parking assist screen 55 such as that shown in FIG. 13 is presented on the display 8. The driver can then see any deviation between the straight driving guide lines St and the white lines on the synthesized image 52, and when the driver turns the vehicle C while maintaining the current steering wheel position (angle) until the rear axle of the vehicle C reaches the first segment St1. On the other hand, if the driver determines that the current steering angle must be modified to compensate for a large deviation between the straight driving guide lines St and the white lines on the synthesized image 52 or to compensate for too large a gap between a white line and each second segment St2, the driver may turn the steering wheel, i.e. change the current steering angle and, responsive to the change in steering angle, all of the processing described above is repeated, and the turning guide lines Rv and straight driving guide lines St are generated anew.

Figure 14:
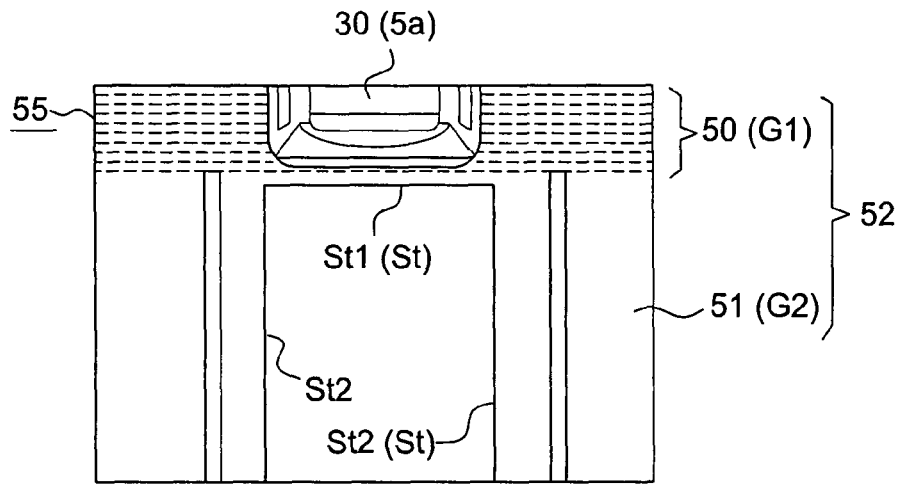
FIG. 14 is an illustration of another parking assist screen.

When the driver confirms proper positions of the straight driving guide lines St relative to the white lines, the driver turns the vehicle C without changing the current steering angle until the rear axle of the vehicle C reaches the first segment St1, at which point the vehicle C will be substantially parallel to the white lines. At this time, a parking assist screen 55 such as that shown in FIG. 14 is presented on the display 8 wherein the turning guide lines Rv are no longer displayed, and the straight driving guide lines St are superimposed on the current image 51. At this point in time, the driver turns the steering wheel back to straighten the wheels and drives the vehicle C straight back so that the vehicle C can be parked in an appropriate position within the target parking space.

When parking is complete, the driver moves the shift lever to change the shift position to a position other than reverse, such as parking or neutral. As a result, the control unit 3 determines that the shift position is not reverse in step S2-2 of FIG. 8 (NO in step S2-2), and then determines whether or not the system activation flag is ON (step S2-9). When the parking assist mode has already been terminated, the system activation flag is OFF (NO in step S2-9), and therefore the control unit 3 determines whether or not the end trigger has been input (step S6). Immediately after the completion of parking, the system activation flag remains ON and therefore, the control unit 3 determines that the system activation flag is ON (YES in step S2-9), and resets the variables stored in the main memory 4 (step S2-10). The control unit 3 then switches the system activation flag OFF (step S2-11) and when an end trigger is input (YES in step S6), the subroutine is terminated.

The first embodiment, provides the following effects and advantages:

(1) In the first embodiment, the turning guide lines Rv corresponding to the current steering angle and the straight driving guide lines St indicating the starting position for straight driving into the target parking space, are presented on the display 8 together with the bird's-eye view synthesized image 52 of the vehicle periphery. Hence, the driver need only drive the vehicle C in reverse to the straight driving start position indicated by the straight driving guide lines St, while maintaining the current steering angle, then turn the steering wheel back to straighten the wheels and then continue in reverse in a straight line from the straight driving start position. Hence, the steering wheel operation of the vehicle C is assisted during a parking operation that would otherwise require a high level of driving skill.

(2) In the first embodiment, a position in which the rear axle of the vehicle C becomes perpendicular to the white lines 100 while maintaining the current steering angle is indicated as a straight driving start position (first segment St1). Hence, the driver can obtain a rough estimate of the straight driving start position. Further, when the straight driving start position is not appropriate, it is recalculated responsive to a turning of the steering wheel to change the current steering angle.

(3) In the first embodiment, the second segments St2 parallel with the white lines 100 are displayed as extending from the first segment St1 where the vehicle C is oriented in parallel with the white lines 100. Hence, the driver is able to determine any deviation between the second segments St2 and the white lines in the synthesized image 52, i.e. the space (distance) between the second segments St2 and the respective white lines. Accordingly, when a deviation between the second segment St2 and the white line is too large, the driver can change the displayed course of travel by turning the steering wheel (and the current steering angle).

(4) In the first embodiment, the vehicle image 30 is superimposed on the synthesized image 52, and therefore the relative positions of the target parking space displayed on the synthesized image 52 and the vehicle C can be easily confirmed. Further, the driver is able to intuitively understand that the turning guide lines Rv, St superimposed on the current image 51 are, respectively, the turning route and straight driving route for the vehicle C to properly enter the target parking space.

(5) In the first embodiment, the current image 51, based on the current image data G2, and the recorded image 50, based on the bird's-eye view data G1 captured and accumulated in the past, are displayed on the parking assist screen 55. Thus, a bird's-eye view image of the vehicle periphery is displayed, and therefore the distance between the white lines on either side of the vehicle and the vehicle C can be easily recognized. Furthermore, since the recorded image 50 and current image 51 can both be displayed, a wider range of the target parking space can be checked.

Second Embodiment

Figure 15:
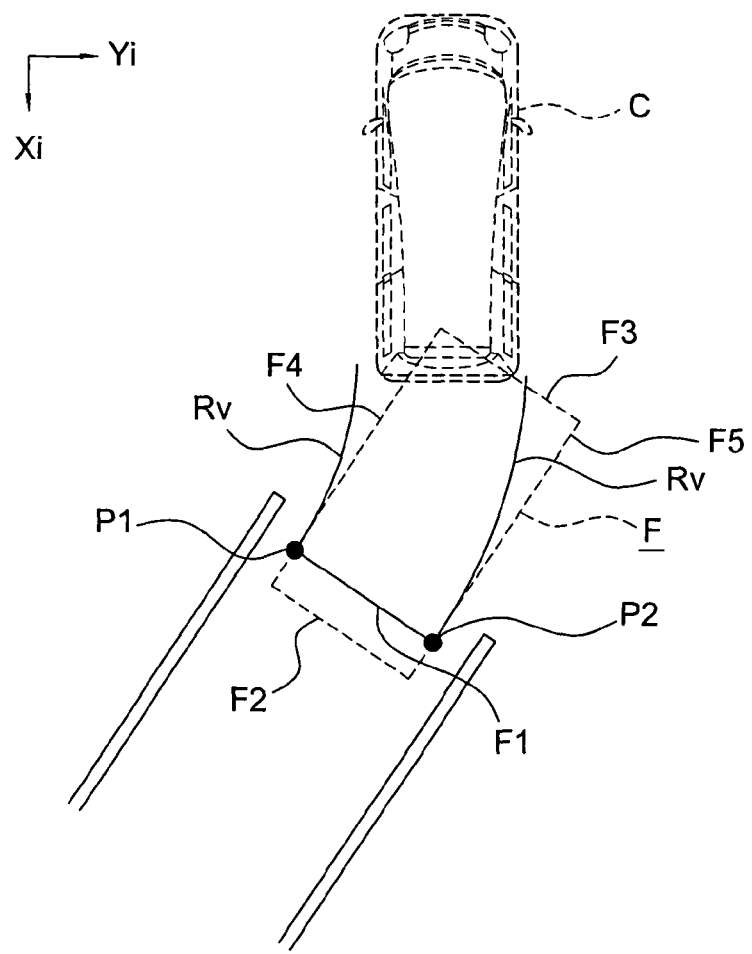
FIG. 15 is an illustration of a parking assist screen showing approach to a straight driving guide frame.

Next, a second embodiment of the present invention will be described with reference to FIGS. 15 and 16. The second embodiment differs from the first embodiment only in that the straight driving guide lines St of the first embodiment are modified, and therefore detailed description of the other features, shared in common, has been omitted.

In the subroutine (see FIG. 11) for generating the turning guide lines Rv and straight driving guide lines St of the second embodiment, the processing is identical to the first embodiment steps S5-1 through S5-6. However, in step S5-7, the image processor 15 generates a straight driving guide frame F as the predicted position index instead of the straight driving guide lines St. The straight driving guide frame F shows the exterior shape of the vehicle in a position where the vehicle C becomes oriented in parallel with the approximated white lines Sg.

The straight driving guide frame F will now be described with reference to FIG. 15. The straight driving guide frame F is formed by a predicted axle position F1, a predicted rear end position F2, a predicted front end position F3, and predicted side positions F4, F5. The predicted axle position F1 is a position of the rear axle is predicted to assume when the vehicle C has moved in reverse from its current position along the predicted turning course lines Tr (see FIG. 6), i.e. holding the steering wheel position, to a position where the vehicle C has become parallel to the approximated white lines Sg. Here, the predicted axle position F1 is shown as a solid line, but may be shown as a broken line. Note that the predicted axle position F1 is in the same position as the first segment St1 of the first embodiment.

Likewise, the predicted rear end position F2 and the predicted front end position F3 are lines which represent the positions of the rear end and front end of the vehicle C, respectively, when the vehicle C has moved in reverse along the predicted course lines Tr (see FIG. 6) to a position where the vehicle C has become parallel to the approximated white lines Sg. Further, the predicted side positions F4, F5 represent the sides of the vehicle C when the rear wheel, rear end, or front end of the vehicle C is in the predicted axle position F1, predicted rear end position F2, or predicted front end position F3. In other words, the predicted axle position F1 is oriented in a direction perpendicular to the approximated white lines Sg, and the predicted side positions F4, F5 are parallel to the approximated white lines Sg.

When the coordinates of the straight driving guide frame F are calculated on the basis of the contact points P1, P2 (step S5-7), the image processor 15 outputs synthesized data G3 similar to that of the first embodiment to the display 8 (step S5-8). Further, the image processor 15 presents the vehicle image data 5a in a predetermined display area Zd of the display 8 (step S5-9).

Having output the synthesized data G3 and vehicle image data 5a as a peripheral image, the image processor 15 also outputs the straight driving guide frame F, the coordinates of which were calculated in step S5-7, and the turning guide lines Rv as guide lines superimposed on the peripheral image (step S5-9).

Figure 16:
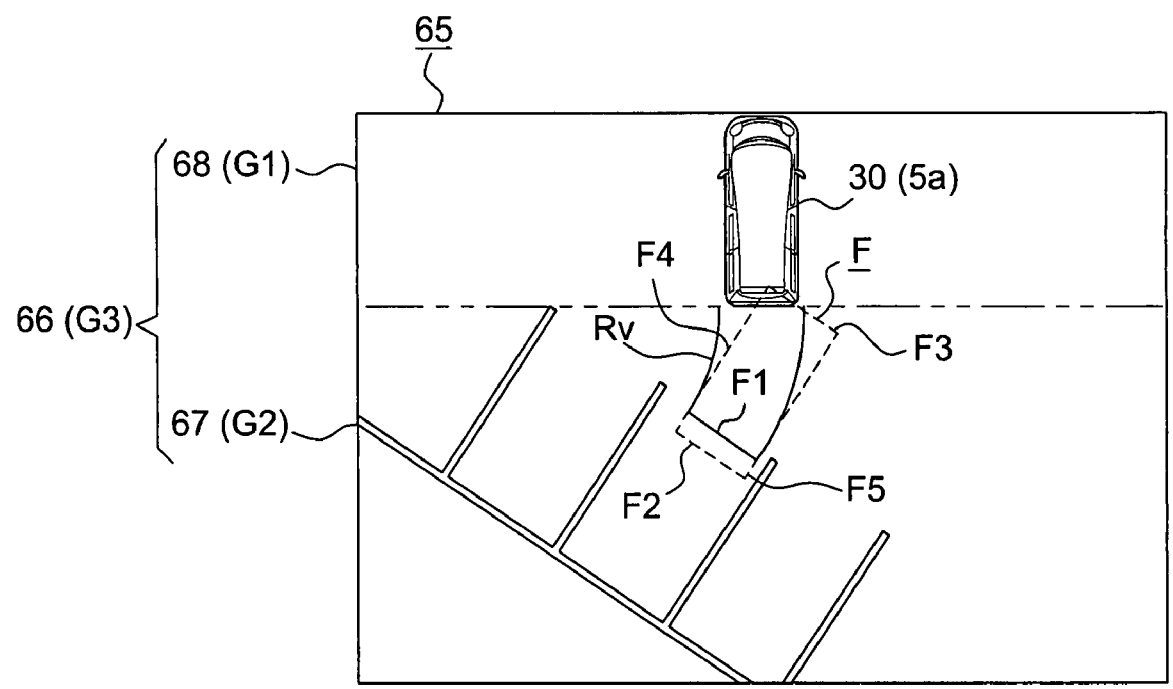
FIG. 16 is an illustration of a parking assist screen in a second embodiment.

As a result, a parking assist screen 65 such as that shown in FIG. 16 is presented on the display 8 wherein synthesized images 66, based on the synthesized data G3, is presented on the parking assist screen 65. The synthesized image 66 of this embodiment represents a larger amount on the bird's-eye view data G1, and therefore a wider vehicle periphery area than that of the first embodiment. The synthesized image 66 consists of display of both a current image 67 based on the current image data G2, and a recorded image 68 based on the bird's-eye view data G1 previously captured and accumulated in the image memory 17. Further, an image 30 of the entire vehicle is superimposed on the recorded image 68.

Further, the straight driving guide frame F and the turning guide lines Rv are superimposed on the synthesized image 66. The straight driving guide frame F is sized (scaled) to represent the actual size of the vehicle C, and therefore the user can understand intuitively that the straight driving guide frame F denotes the position of the vehicle after travel in reverse in accordance with the turning guide lines Rv (without change of the current steering angle). Further, the fact that the straight driving guide frame F is parallel to the white lines as present on the synthesized image 66 can be confirmed from the screen, and therefore the driver will understand that the vehicle C should be driven straight back from the position of the straight driving guide frame F. After generating the superimposed guide lines (step S5-10), the routine advances to step S6, where a determination is made as to whether or not an end trigger has been input.

Accordingly, the following effect can be obtained.

(6) In the second embodiment, the straight driving guide frame F denoting the vehicle C when it becomes oriented parallel to the white lines 100 is displayed as the straight driving start position based on the contact points P1, P2 where the approximated white lines Sg or parallel expressions Sg1 intersect the predicted turning course lines Tr. In other words, the straight driving start position is depicted as a frame representing the exterior shape of the vehicle C, and therefore, the driver can easily understand the straight driving guide frame F.

The embodiments described above may be modified in various respects, including the following ways.

In the embodiments described above, the bird's-eye view data G6 is written into a corresponding area of the memory area A of the main memory 17; however, the bird's-eye view data G1 may be stored in association with the coordinate data and steering angle data. Further, the image data G may be stored in the image memory 17 without being subjected to bird's-eye view conversion.

In the embodiments described above, the image recording distance D1 is set at 100 mm, but may be set at another distance.

In the embodiments described above, the bearing detection signal GRP from the gyroscope 21 may be used instead of the steering sensor signal STP in data accumulation and image processing.

The synthesized image 52 may be generated using a synthesis method other than that described above. For example, the bird's-eye view data may be output to the display 8 immediately after conversion, without accumulating the image data input from the camera 25. Alternatively, instead of a bird's-eye view image, the turning guide lines Rv and straight driving guide lines St may be superimposed on a peripheral image of the front, rear, or other view relative to the vehicle C. Note that when the image data G is presented on the display 8 without being converted to a bird's-eye view and edge extraction is used to calculate the turning guide lines Rv and straight driving guide lines St, edge extraction from the image data G may be executed, without converting the image data G to a bird's-eye view.

In the embodiments described above, the display enabled flag is switched ON when the predetermined amount of bird's-eye view data G1 has accumulated in the image memory 17, but, alternatively, the display enabled flag may be switched ON when bird's-eye view data G1 has been written for an entire predetermined data area. Alternatively, the display enabled flag may be switched ON or the synthesized image 52 (recorded image 50) may be displayed when only one set of bird's-eye view data G1 has been accumulated in the image memory 17. In this case, a mask, for example, may be displayed in the areas for which bird's-eye view data G1 has not been accumulated.

The parking assist screen 55, 65 may be a screen displaying the guide lines Rv, St and the current image 51 and omitting the recorded image 50, 68.

Figure 17A:
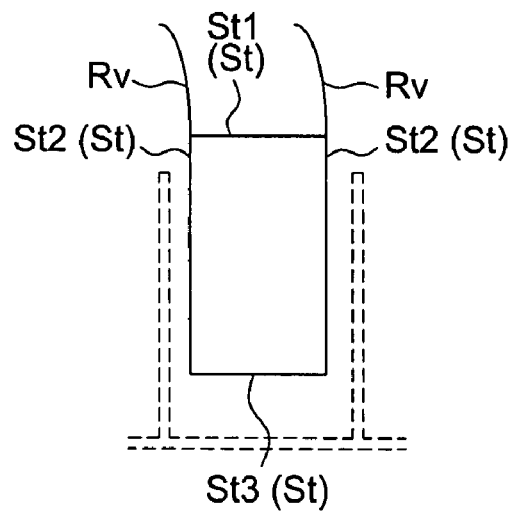
FIG. 17A is an illustration showing another example of a parking assist screen with guide lines defining a third segment.
Figure 17B:
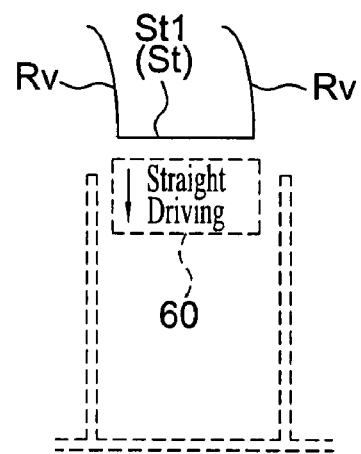
FIG. 17B illustrates a parking assist screen omitting guide lines for second segments.
Figure 17C:
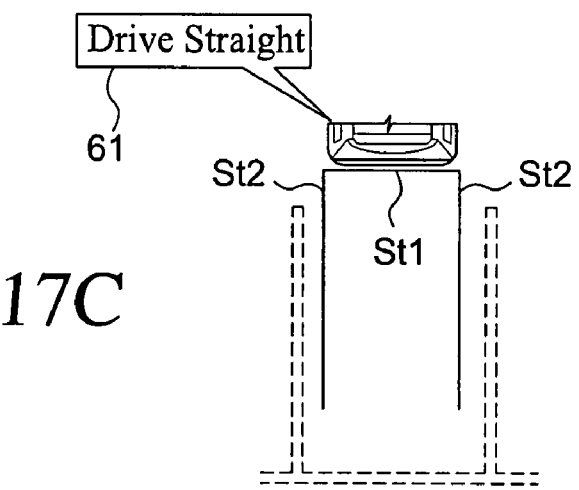
FIG. 17C illustrates voice output assistance.

In the first embodiment, the turning guide lines Rv and straight driving guide lines St may be guide lines other than those described above. For example, as shown in FIG. 17A, a third segment St3 parallel to the first segment St1 may be shown at the terminals of the second segments St2 to illustrate the size of the vehicle body. Alternatively, as shown in FIG. 17B, the second segments St2 may be omitted such that only the first segment St1 of the straight driving guide lines St is shown. In this case, a frame 60 indicating the straight driving start position may be displayed in the vicinity of the first segment St1. Alternatively, the first segment St1 may be omitted such that only the second segments St2 are shown. Further, as shown in FIG. 17C, a voice 61 instructing "Drive straight" or the like may be output through the speaker 12 when the vehicle C approaches the first segment St1.

Figure 18:
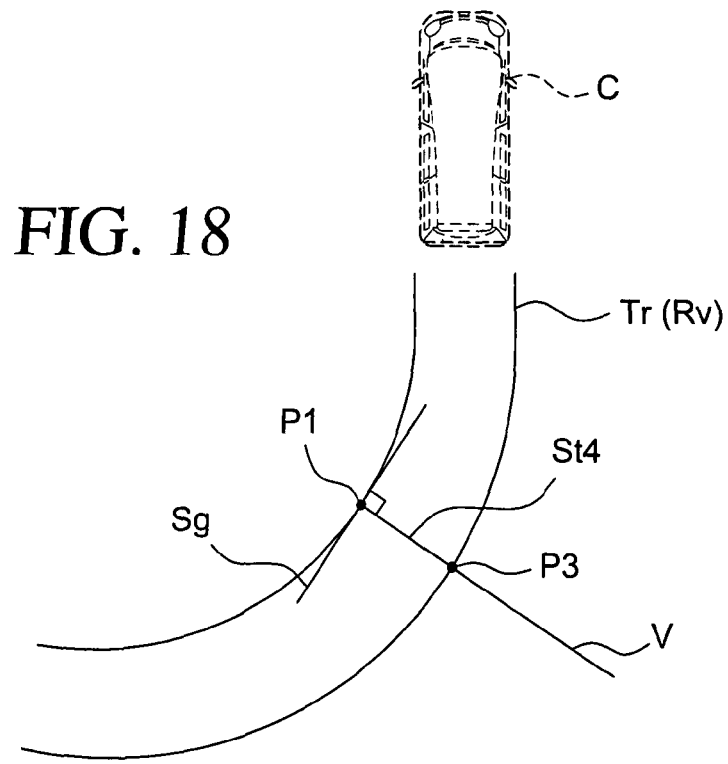
FIG. 18 is an illustration explaining generation of guide lines.

In the embodiments described above, the guide lines Rv, St are only shown when the pair of approximated white lines Sg are approximated, but the guide lines Rv, St may be shown with only one approximated white line Sg. For example, as illustrated in FIG. 18, the image processor 15 determines a contact point P1 between a single approximated white line Sg (or an approximated parallel line, parallel to the approximated white line Sg) and a predicted turning course line Tr. A line V perpendicular to the approximated white line Sg (or approximated parallel line) passing through the contact point P1 is then determined, and a contact point P3 between the perpendicular line V and the other predicted turning course line Tr is determined. A fourth segment St4 connecting the contact point P1 and the contact point P3 is then drawn. The fourth segment St4 denotes the straight driving start position in the first embodiment, similarly to the first segment St1, and denotes the predicted axle position F1 in the second embodiment. Further, second segments St2, parallel to the approximated white line Sg, or a straight driving guide frame F (not shown in FIG. 18) are generated using the contact point P1 and the contact point P3 as starting points.

The image processor 15 may detect the edges of parked other vehicles instead of the white lines. The contact points P1, P2 between the edges and the predicted course lines Tr may then be determined recognizing the need for a distance between the edges and a target parking space, and the turning guide lines Rv and straight driving guide lines St may be determined therefrom.

Figure 19:
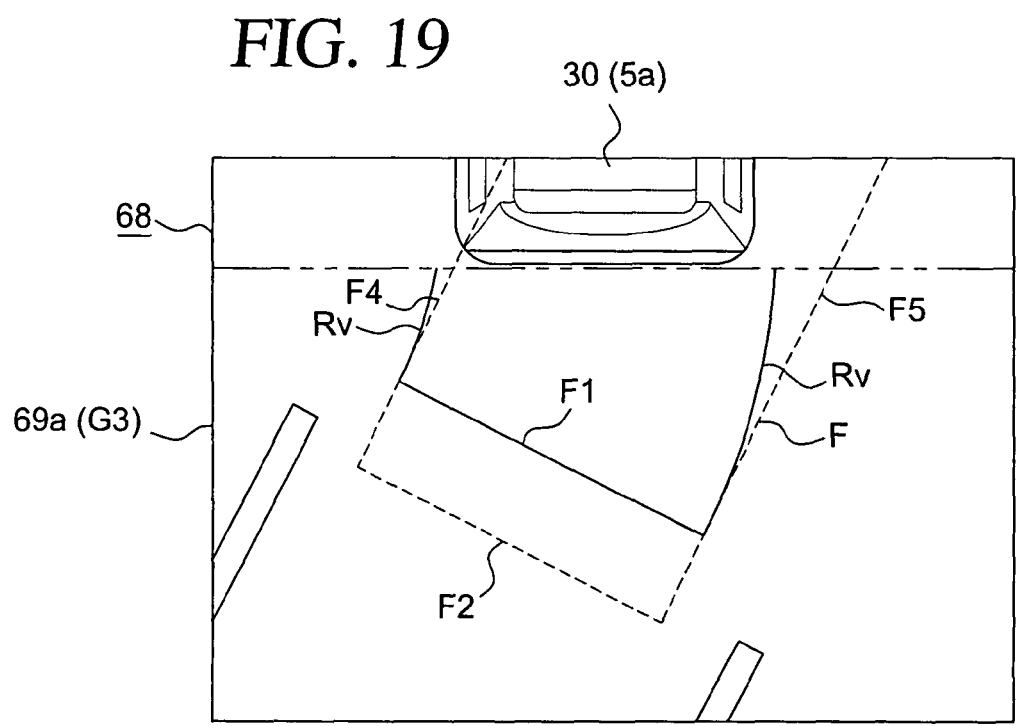
FIG. 19 is an illustration of another example of a guide line.

In the second embodiment, a vehicle image 30 consisting of only the rear portion of the vehicle C may be displayed, as shown in the parking assist screen 69 of FIG. 19. Further, as shown in FIG. 19, the entire straight driving guide frame F need not be included in the synthesized image 69a, provided at least a part of the straight driving guide frame F is included. In this case also, it is possible to determine whether or not the straight driving guide frame F is parallel with the white lines on the synthesized image 69a.

Figure 20A:
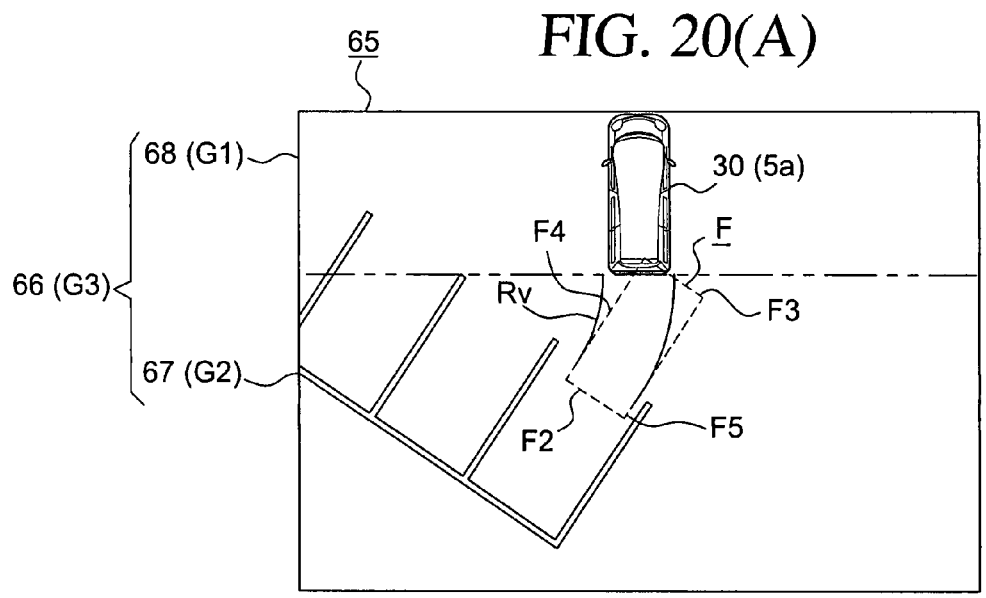
FIG. 20A is an illustration of guide lines omitting a predicted axle position.
Figure 20B:
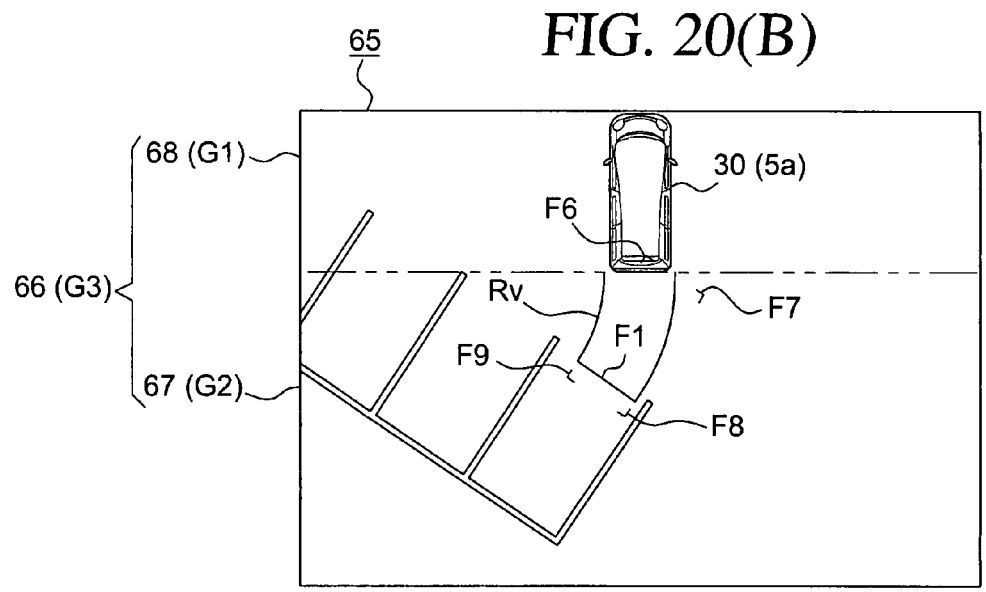
FIG. 20B is an illustration of guide lines having a modified straight driving guide frame.

In the second embodiment, as shown in FIG. 20A, the straight driving guide frame F may be a square shape omitting the predicted axle position F1. Alternatively, as shown in FIG. 20B, the straight driving guide frame F may consist of corner indicators F6 to F10 representing the corner portions of the vehicle C when the vehicle C is parallel to the approximated white lines Sg, and the predicted axle position F1.

Figure 21:
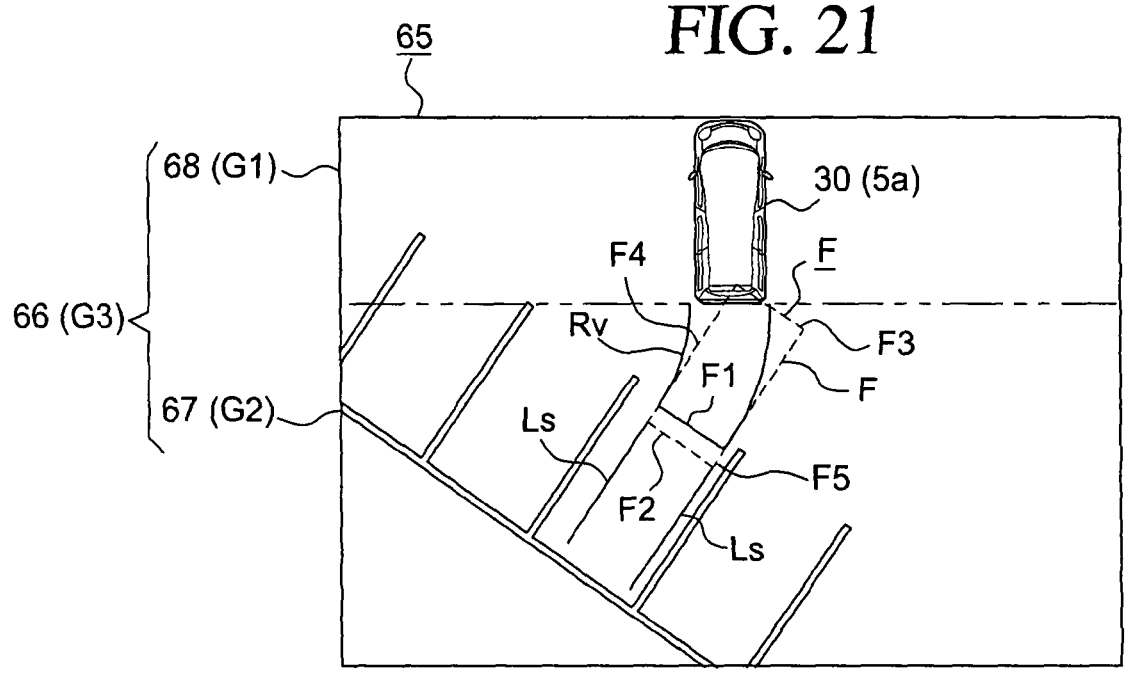
FIG. 21 is an illustration of another example of a guide line.
Figure 22:
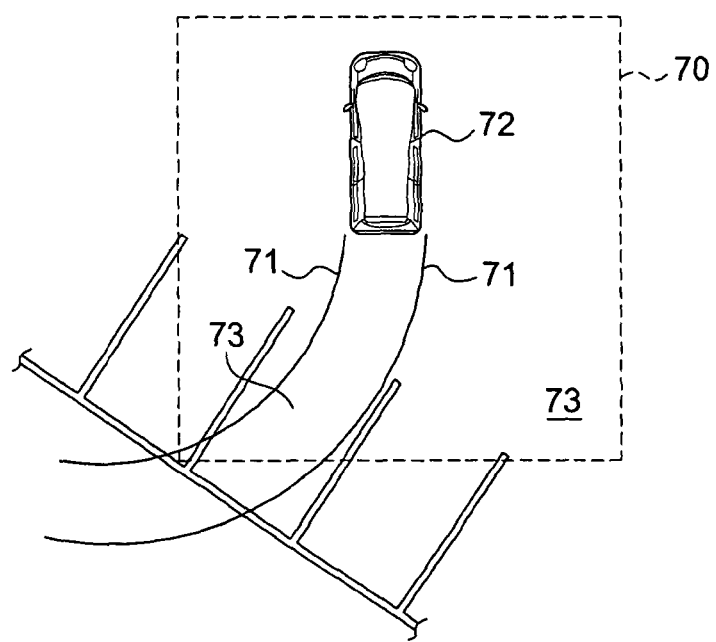
FIG. 22 is an illustration of a conventional guide line.

In the second embodiment, as shown in FIG. 21, predicted straight driving course lines Ls may be shown on the far side of the straight driving guide frame F (side opposite the vehicle image 30). The predicted straight driving course lines Ls are shown as extensions of the predicted side end positions F4, F5, and denote the predicted course when reversing from the straight driving guide frame F. The predicted straight driving course lines Ls correspond to the second segments St2 of the first embodiment. In so doing, the relative distance and relative direction between the vehicle C and the white lines after reversing from the straight driving guide frame F can be understood.

In the embodiments described above, the first segment St1 and the predicted axle position F1 represent the rear axle position when the vehicle C becomes parallel to the target parking space. Alternatively, the first segment St1 and predicted axle position F1 may be presented as the predicted position of the rear end of the vehicle C. In this case, the vehicle C can be parked in the target parking space by movement in reverse along the turning guide lines Rv until the rear end of the vehicle C coincides with the first segment St1 or the predicted axle position F1, and then turning the steering wheel to straighten the wheels so as to drive straight back.

In the embodiments described above, the parking assist screen 55 is generated from the image data G generated by the camera 25 mounted at the rear end of the vehicle, but a camera attached to a side or front end of the vehicle may be used. For example, when a camera attached to the front end of the vehicle is used, parking assistance can be provided to assist front end parking of the vehicle C.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A parking assist method comprising:
   displaying a peripheral image of an area around a periphery of a vehicle based on image data obtained from an imaging device mounted in the vehicle;
   detecting, from the image data, spaced and parallel straight defining lines defining a target parking space;
   predicting spaced turning course lines based on steering angle of the vehicle;
   calculating spaced contact points where the parallel straight defining lines respectively contact the spaced, predicted turning course lines; and
   superimposing on the displayed peripheral image a display of a straight line connecting the contact points as a straight driving guide index indicating a position for starting straight driving into the target parking space.

2. The parking assist method according to claim 1 further comprising:
   cutting off portions of the predicted turning course lines extending away from the vehicle beyond the straight driving guide index to form turning guide lines corresponding to the distance between the rear end of the vehicle and the straight driving guide index;
   determining straight driving course guide lines extending from the contact points, into the target parking space in parallel with the straight defining lines; and
   displaying the turning guide lines and straight driving course guide lines superimposed on the peripheral image.

3. The parking assist method according to claim 2 wherein the straight driving course guide lines have a length substantially identical to the vehicle length as displayed.

4. The parking assist method according to claim 1 further comprising recalculating the straight driving guide index responsive to a change in the steering angle.

5. A parking assist apparatus for installation in a vehicle, comprising:
   an image data input unit for obtaining image data from an imaging device mounted on the vehicle;
   defining line detecting means for detecting, from the image data, spaced and parallel straight defining lines defining a target parking space;
   output control means for outputting a peripheral image for an area around the periphery of the vehicle, based on the image data, to a display unit; and
   first index generating means for predicting spaced turning course lines based on steering angle of the vehicle, for calculating spaced contact points where the straight defining lines or straight lines parallel to the straight defining lines respectively contact spaced, predicted turning course lines based on a steering angle of the vehicle, for generating, based on the calculated contact points, a straight driving guide index indicating a position for starting straight driving into a target parking space, and for superimposing a display of the straight driving guide index on the peripheral image.

6. The parking assist apparatus according to claim 5, further comprising a second index generating means for generating a predicted turning route index as portions of the predicted turning course lines and for displaying the predicted turning route index superimposed on the peripheral image.

7. The parking assist apparatus according to claim 6, wherein the first index generating means calculates a vehicle position at which the vehicle will become parallel with the straight defining lines on the basis of the contact points, and generates and displays a predicted position index in the shape of the vehicle exterior.

8. The parking assist apparatus according to claim 7, further comprising vehicle image generating means for displaying a current position index indicating the current position of the vehicle, superimposed on the peripheral image.

9. The parking assist apparatus according to claim 8, further comprising:
   an image data storage unit for storing the image data obtained from the imaging device as recorded image data; and
   image synthesizing means for synthesizing the recorded image data and current image data to provide synthesized data for display of both a current dead area of the imaging device and a current imaging area of the imaging device.

10. The parking assist apparatus according to claim 9, further comprising:
    image processing means for converting the image data into bird's-eye view data for simulating a bird's-eye view of the vehicle periphery; and
    wherein the output control means displays a bird's-eye view image, based on the bird's-eye view data, on the display unit; and
    wherein the first index generating means superimposes a display of the straight driving guide index on the displayed bird's-eye view image.

11. The parking assist apparatus according to claim 6, further comprising vehicle image generating means for displaying a current position index indicating the current position of the vehicle, superimposed on the peripheral image.

12. The parking assist apparatus according to claim 3, further comprising:
    an image data storage unit for storing the image data, obtained from the imaging device as recorded image data; and
    image synthesizing means for synthesizing the recorded image data and current image data to provide synthesized data for display of both a current dead area of the imaging device and a current imaging area of the imaging device.

13. The parking assist apparatus according to claim 5, wherein the first index generating means displays the straight lines parallel to the straight defining lines and extending, in the display, from the contact points into the target parking space.

14. The parking assist apparatus according to claim 5, wherein the first index generating means calculates a vehicle position at which the vehicle will become parallel with the straight defining lines on the basis of the contact points, and generates and displays a predicted position index in the shape of the vehicle exterior.

15. The parking assist apparatus according to claim 5, further comprising vehicle image generating means for displaying a current position index indicating the current position of the vehicle, superimposed on the peripheral image.

16. The parking assist apparatus according to claim 5, further comprising:
    an image data storage unit for storing the image data, obtained from the imaging device as recorded image data,
    image synthesizing means for synthesizing the recorded image data and current image data to provide synthesized data for display of both a current dead area of the imaging device and a current imaging area of the imaging device.

17. The parking assist apparatus according to claim 5, further comprising:

an image data storage unit for storing the image data, obtained from the imaging device as recorded image data; and image synthesizing means for synthesizing the recorded image data and current image data to provide synthesized data for display of both a current dead area of the imaging device and a current imaging area of the imaging device.

18. The parking assist apparatus according to claim 5, further comprising:

image processing means for converting the image data into bird's-eye view data for simulating a bird's eye view of the vehicle periphery; and wherein the output control means displays a bird's-eye view image, based on the bird's-eye view data, on the display unit; and wherein the first index generating means superimposes the straight driving guide index on the displayed bird's-eye view image.

19. The parking assist apparatus according to claim 5 wherein the first index generating means recalculates the driving guide index responsive to a change in the steering angle.

* * * * *

UNITED STATES PATENT AND TRADEMARK OFFICE
CERTIFICATE OF CORRECTION

PATENT NO. : 7,969,326 B2  
APPLICATION NO. : 11/806075  
DATED : June 28, 2011  
INVENTOR(S) : Seiji Sakakibara Page 1 of 1

It is certified that error appears in the above-identified patent and that said Letters Patent is hereby corrected as shown below:

On face of patent, please add the following:

Under the heading "U.S. PATENT DOCUMENTS"

"2002/1012382" should read --2002/0123829--

Column 16, line 31 (claim 12, line 1), "claim 3" should read --claim 6--.

Signed and Sealed this
Eleventh Day of October, 2011

David J. Kappos
*Director of the United States Patent and Trademark Office*